United States Patent
Carter, Jr.

[11] Patent Number: 5,868,355
[45] Date of Patent: Feb. 9, 1999

[54] FUSELAGE DOOR FOR PRESSURIZED AIRCRAFT

[75] Inventor: Jay W. Carter, Jr., Burkburnett, Tex.

[73] Assignee: Cartercopters, L.L.C., Wichita Falls, Tex.

[21] Appl. No.: 985,557

[22] Filed: Dec. 5, 1997

Related U.S. Application Data

[60] Provisional application No. 60/032,135 Dec. 9, 1996.

[51] Int. Cl.[6] .................................................... B64C 1/14
[52] U.S. Cl. ......................................... 244/129.5; 114/117
[58] Field of Search ............................ 244/129.4, 129.5, 244/131; 114/116, 117, 120

[56] References Cited

U.S. PATENT DOCUMENTS

| | | |
|---|---|---|
| 3,585,757 | 6/1971 | Ritchie .................................. 244/129.5 |
| 3,591,111 | 7/1971 | Spence ................................. 244/129.5 |
| 3,718,171 | 2/1973 | Godwin ................................ 244/129.5 |
| 4,053,902 | 10/1977 | Skafvenstedt et al. . |
| 4,156,244 | 5/1979 | Erikson et al. . |
| 4,162,501 | 7/1979 | Mitchell et al. . |
| 4,429,320 | 1/1984 | Hattori et al. . |
| 4,551,906 | 11/1985 | Hara . |
| 4,568,954 | 2/1986 | Rosback . |
| 4,604,633 | 8/1986 | Kimura et al. . |
| 4,760,409 | 7/1988 | Kiyohara et al. . |
| 5,036,770 | 8/1991 | Liewellin et al. ................... 244/129.5 |
| 5,137,379 | 8/1992 | Ukai et al. . |
| 5,259,576 | 11/1993 | Howard ............................... 244/129.5 |
| 5,506,611 | 4/1996 | Ujita et al. . |
| 5,610,635 | 3/1997 | Murray et al. . |

*Primary Examiner*—Verna Lissi Mojica
*Attorney, Agent, or Firm*—James E. Bradley

[57] ABSTRACT

A fuselage door for a pressurized aircraft fuselage in which the hoop tension loads caused by cabin pressure are carried through the door rather than around the door. Stationary interlocking moldings in the door and fuselage door seat transfer loads through the door-fuselage intersection. The interlocking portions of the moldings have a sloped engaging portion having an angle such that the inward directed force component of tension due to a pressure differential is less than the outward directed force from cabin pressure on the door.

14 Claims, 5 Drawing Sheets

FUSELAGE DOOR FOR PRESSURIZED AIRCRAFT

This application claims the benefit of U.S. Provisional Application No. 60/032,135, filed Dec. 9, 1996.

TECHNICAL FIELD

This invention relates to the structure and mechanism for engaging, sealing and locking the fuselage door in a pressurized aircraft.

BACKGROUND ART

Prior art pressurized fuselage doors are not a structural part of the fuselage, in that they do not carry any of the hoop tension caused by cabin pressure. Rather, the hoop tension is carried around the door in the door jamb structure, requiring extra weight because of the stress concentration around the hole in the fuselage. The internal pressure on the door causes a bending moment in the door, requiring a substantial and heavy door structure.

Much of this weight and complication could be eliminated if hoop stress could be transferred through the door structure. The prior art, however, shows no simple and reliable method for doing this.

Accordingly, an object of the invention is to provide a pressurized fuselage door for aircraft which is lighter and simpler than the prior art and which enables a lighter surrounding fuselage structure.

A further object of the invention is to provide a reliable method of carrying hoop stress through a hatch in a pressure vessel without complicated linkages.

A further object of the invention is to provide a door operable in highly curved or complex curved fuselages.

The above as well as additional objects, features, and advantages of the invention will become apparent in the following detailed description.

DISCLOSURE OF INVENTION

A door for a pressurized vessel, in which the vessel wall has a door engaging portion and the door has a vessel engaging portion. The door engaging portion has door engaging face oriented at a selected acute angle relative to a line perpendicular to the outer surface nearest the door engaging portion. The vessel engaging portion has a vessel engaging portion parallel to and engaging the door engaging face when the door is closed. The acute angle is selected such that an inward directed force component of hoop tension due to the acute angle is less than the outward directed force component of pressure differential on the door. The vessel engaging portion engages the door seat so that the door is held in place in a closed position by the pressure differential and hoop and axial tension are transferred through the door.

BEST MODE FOR CARRYING OUT INVENTION

Figure 1:
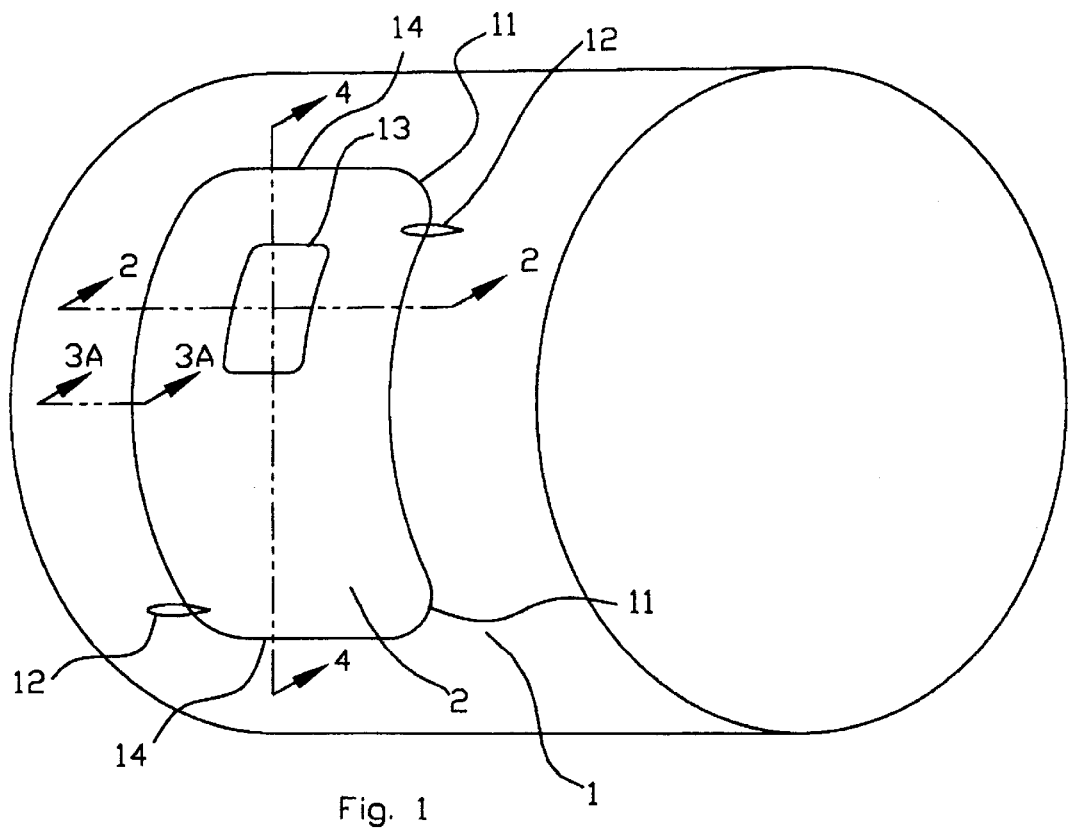
FIG. 1 is a schematic view of a cylindrical aircraft fuselage having a door.

FIG. 1 shows a fuselage 1 of an aircraft, having a door 2, two exterior door handles 12, and a window 13 in door 2. Fuselage 1 is generally cylindrical in shape and is pressurized for the safety and comfort of passengers at high flight altitudes.

Figure 2:
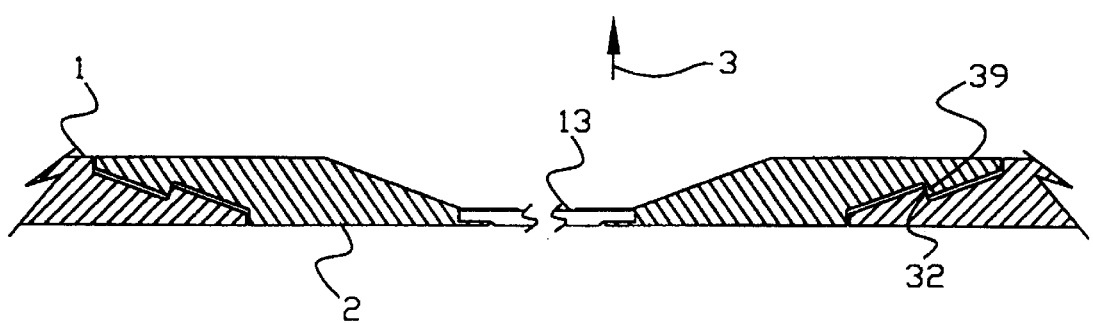
FIG. 2 is a cross sectional view of the door of FIG. 1, taken along the line 2—2 of FIG. 1.

FIG. 2 shows a horizontal cross section through the fuselage, showing the shape of door 2 and fuselage 1 at the sides of the door. When the fuselage 1 and door 2 are in the interlocked position, the door is closed, and faces 32, 39 of the fuselage 1 and door 2, respectively, are parallel and engage one another. Door 2 opens by a straight inward movement as indicated by arrow 3. A mechanism (not shown) will allow door 2 to slide out of the door opening once it is pushed inward a short distance. The mechanism optionally may allow the door to slide forward, rearward or upward once it is moved inward.

Figure 3A:
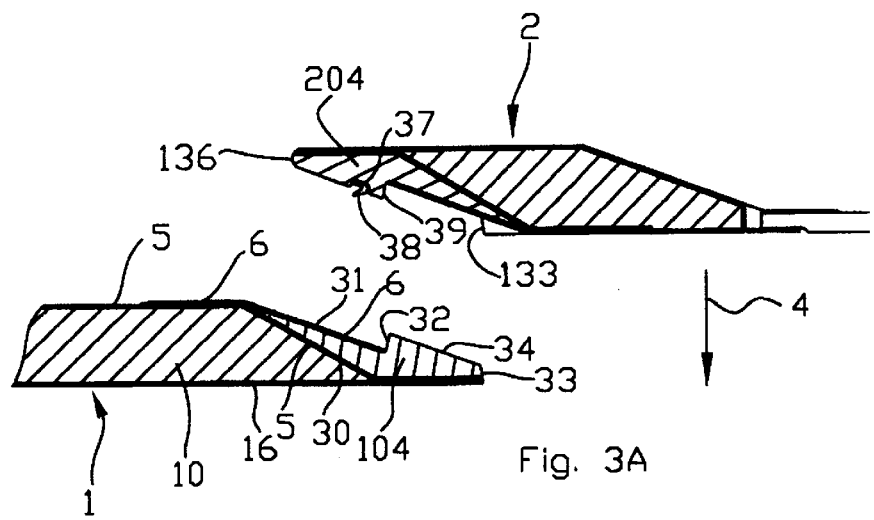
FIG. 3a is an enlarged sectional view of the door of FIG. 1, taken along the line 3a—3a of FIG. 1, but showing the door moved to an open position.
Figure 3B:
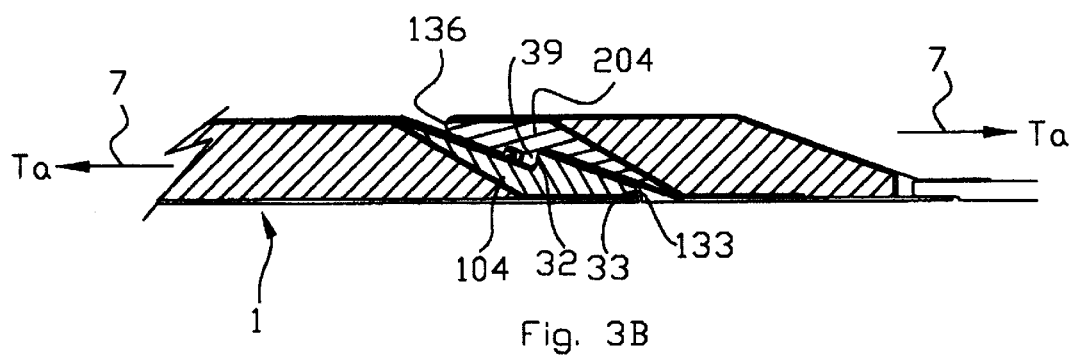
FIG. 3b is a sectional view similar to FIG. 3a, but showing the door closed.

FIGS. 3a and 3b are enlarged views of one side of the door, with the door open and closed respectively. To close, door 2 is inserted into fuselage doorway 1 such that they interlock with one another, as show in FIG. 3b, and a smooth interconnecting junction is formed between the fuselage 1 and the door 2. Arrow 4 of FIG. 3a indicates outward movement of door 2 to the closed position.

The lay-ups of the interlocking fuselage doorway 1 and door 2 described herein include one or more layers of composite fabric, such as fiberglass in an epoxy matrix, with the number and orientation of the layers varying according to design pressure differential, the location of other nearby structures, such as windows, and other factors. The various types of suitable materials and the lay-up used is well within the knowledge of those skilled in the art and can vary widely.

For ease of description, the terms interior, exterior, inner and outer are with reference to the interior and exterior of the aircraft fuselage. Downward is defined as towards the bottom of the page when moving from left to right on the page.

As shown in FIG. 3a, in this particular embodiment, the edge of the doorway opening of fuselage 1, which interlocks with the door 2, has an outer composite shell or lay-up 16. Structural core or foam 10, such a PVC foam, is bonded to the interior surface of this outer lay-up 16. The foam 10 terminates in a downward sloped surface 30, which slopes at a generally acute angle relative to lay-up 16. The outer lay-up 16 extends beyond the leading edge 30 of the foam 10 a distance. Composite lay-up 5 is applied to this extended portion of lay-up 16, to the entire sloped surface 30, and extends along the interior surface of the foam 10, as shown. The lay-ups 5 and 16 thus surround the foam 10 to form a stiff sandwich structure.

A generally wedged-shaped molding 104, formed from machined or extruded aluminum, is bonded to the interior surface of lay-up 5, directly abutting and overlaying lay-up 5 over the sloped surface 30 of the foam 10. The molding 104 extends beyond the sloped leading edge 30 a distance and has a flat outer surface configured to lay against that portion of lay-up 5 that is bonded directly to lay-up 16. An interior lay-up 6 (FIG. 3a) is bonded to the interior surface of the structural foam 10, over lay-up 5 and to the inward facing surface 31 of molding 104, terminating at the base of a step or base 32. Lay-ups 5 and 6 thus grip both sides of molding 104, providing a large bond area to resist axial tension carried by engaging faces 32 and 39 and caused by interior pressure. Molding 104 forms a door engaging seat.

Molding 104 has another inward facing surface 34 which is tapered or inclined at the same angle as inward facing surface 31 but located in an offset plane. Inward facing surface 34 terminates at the edge 33 of the door opening. Face 32 joins the two inward facing surfaces 31, 34, similar to a step. Face 32 is positioned halfway between the inner and outer walls of fuselage 1. Face 32 in molding 104 is at particular angle to the fuselage exterior surface as will be further discussed later. Edge 33 at the tip of molding 104 also has an angle of approximately 10 degrees to the exterior surface to provide an interference free draft when closing the door 2, and to provide a thick edge to the fuselage 1 for durability.

The portion of the door 2 that interlocks with the fuselage 1 is a fuselage engaging seat 204 configured generally like that of molding 104 of fuselage 1 so that the two engage and interlock with one another, the only difference being the presence of a groove 37 in molding 204 holding a seal 38. In this way a sealing engagement with the fuselage 1 is created along the entire periphery of the door 2 with the door 2 and fuselage 1 being generally flush with one another. Door 2 may be constructed using the already finished fuselage opening as a mold to ensure a perfect match.

As shown in FIG. 3b, the moldings 104, 204 are mounted such that when there is tension on the door, face 32 is parallel to and contacting face 39, and the tension is carried by the fabric lay-ups bonded to both sides of the moldings, and then to the interior and exterior skins. Edges 33, 133 are parallel but with a slight clearance such that they are cosmetic and do not carry any load.

Figure 3C:
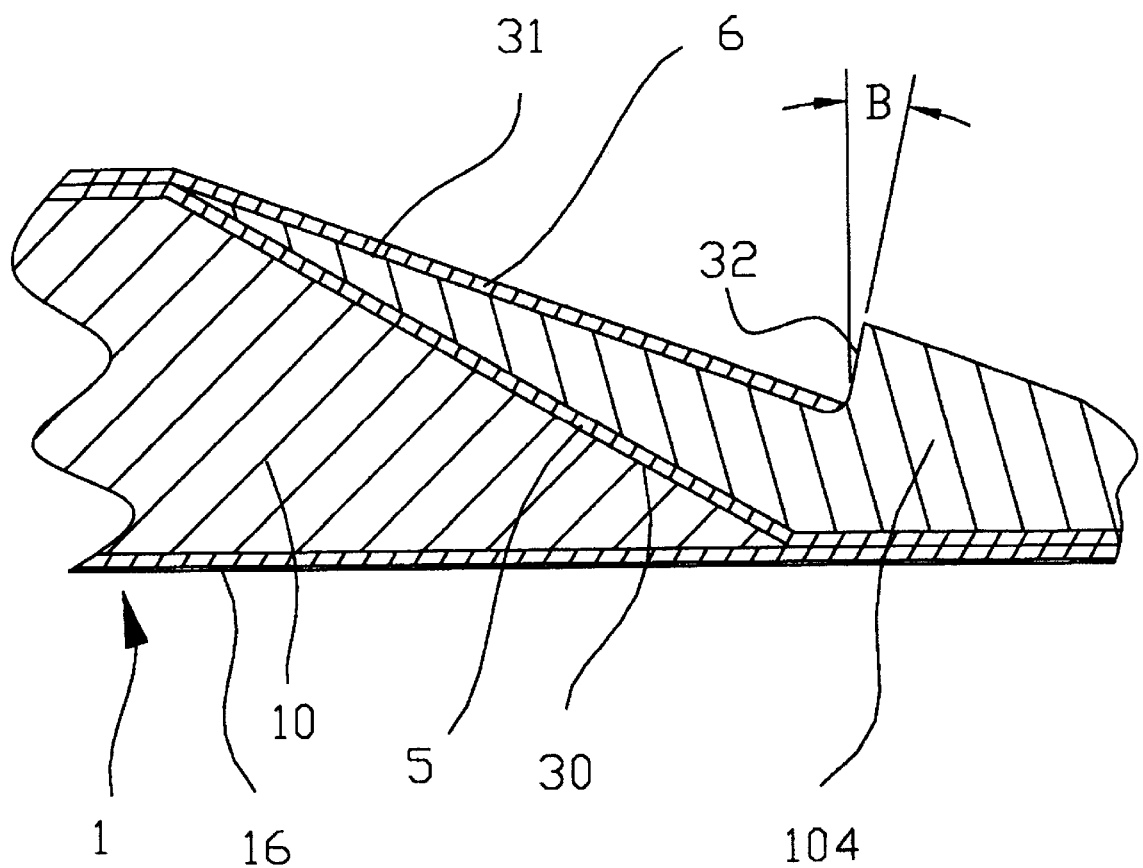
FIG. 3c is a further enlarged cross sectional view of an edge portion of the fuselage as shown in FIGS. 3a and 3b.

Face 32 must be at an angle to the fuselage exterior surface to provide draft so that door 1 will close easily. The numeral 4 in FIG. 3a indicates the direction of movement of door 2 when closing. Direction 4 is perpendicular to the inner and outer walls of fuselage 1. To avoid interference between faces 32, 39 when closing, the protruding corner of face 32 must be farther to the right, toward the door opening, than the protruding corner of face 39. If faces 32, 39 were exactly perpendicular to the exterior surface 16 of fuselage 1, there would not be enough clearance or draft for closure because of the closing direction 4. Consequently, face 32 must be at a positive angle B, as shown in FIG. 3c, relative to exterior surface 16, and face 39 must be at the same angle. The words "positive angle" as used herein refers to an inclination of face 32 toward the door opening, which allows the protruding corner of door face 39 to move directly into engagement with the root of fuselage face 32.

Because angle B is positive, however, an inward directed force component of axial tension is created which acts inward and tries to open door 2. Axial tension Ta is indicated by arrows 7 in FIG. 3b, and angle B tends to cause face 39 to slide inward off of face 32. Counteracting this inward directed force component is an outward directed force component due to the pressure differential between the interior and exterior of the door. The angle B of the surface 32 is chosen such that this inward force is less than the outward force.

For a cylindrical fuselage, such as that shown in FIG. 1, the axial tension Ta which is applied to the door/fuselage union at the sides of door 2 is calculated as:

$$Ta = \frac{Dp \times Rc}{2} \qquad \text{(Eq. 1)}$$

where:

Ta is the axial tension in pounds per inch, Dp is pressure differential between internal pressure and external pressure in pounds per square inch, Rc is the radius of the fuselage in inches.

The inward component of axial tension per inch of door circumference can be calculated by the equation:

$$Ta_1 = \frac{Dp \times Rc \times \tan(B)}{2} \qquad \text{(Eq. 2)}$$

where:

$Ta_1$ is the inward component of axial tension and B is the angle of the surface 32 of molding 104 as measured from a line perpendicular to the fuselage surface where the fuselage and door intersect. Angle B is illustrated in FIG. 3c.

The force component Fo due to Dp is shown in FIG. 3b by the number 8. The outward force of the door per inch of door height is:

$$Fo = Dp \times Ad \qquad \text{(Eq. 3)}$$

where Ad is the area of a one inch wide horizontal strip of the door in square inches.

We define a critical angle B to be the angle at which the inward and outward forces are equal. The actual angle should be less than the critical angle so that the outward force is greater than the inward force and therefore the door locks when under pressure. The critical angle B is calculated as follows:

$$B < \tan^{-1}\left(\frac{Ad}{Rc}\right) \qquad \text{(Eq. 4)}$$

where:

B is the critical angle, measured from perpendicular to the vessel surface.

For an 18 inch wide door in a 72 inch radius fuselage, the critical angle B is 14 degrees. Angle B may be less than 14 degrees, with the lower limit being the amount of draft or clearance needed between faces 32, 39 to close door 2.

Since door 2 is rounded at the corners 11 (FIG. 1), the area of each horizontal strip decreases at the top and bottom corners 11 of the door. Therefore, the critical angle also decreases at the corners. However, the door is structurally a single unit so that the corners of the door can have draft angles greater than the critical angle as long as other nearby areas have draft angles sufficiently less than the critical angle to overcome the net inward force at corners 11. As will be seen with FIG. 4, the net outward force at the straight top and bottom portions 14 (FIG. 1) of door 2 can easily hold in corners 11. In practice, moldings 104, 204 may be formed as an extruded strip. Short segments of moldings 104, 204 may be used at the corners of door 2 and the fuselage 1 door opening. These segments will have the same configuration for faces 32, 39 as on the curved side edges of door 2 and fuselage 1 door opening.

The critical angle calculations above assume no friction between the mating surfaces. Friction at the mating surfaces of the moldings adds a safety factor which would hold the door shut when under pressure even at angles slightly greater than the critical angle, if door 2 is initially fully closed. If door 2 is not fully closed when pressure begins, however, door 2 will not pull itself closed against friction unless the angle of faces 32, 39 is sufficiently lower than the critical angle B such that the outward force Fo exceeds the sum of friction plus the inward force due to axial tension Ta acting on the engaging surfaces.

Figure 4B:
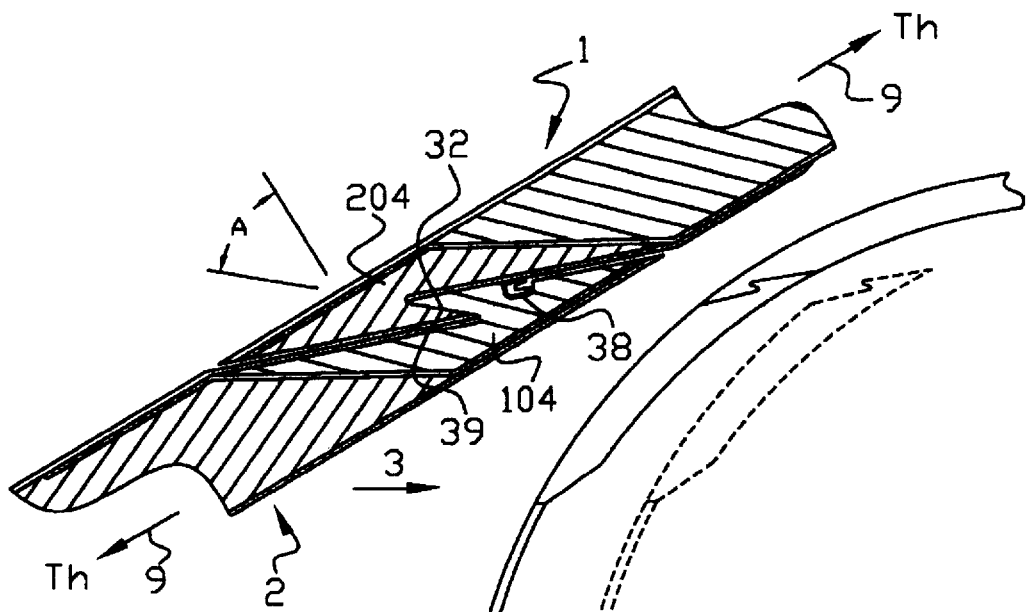
FIG. 4b is an enlarged cross sectional view through the top of the door.
Figure 4A:
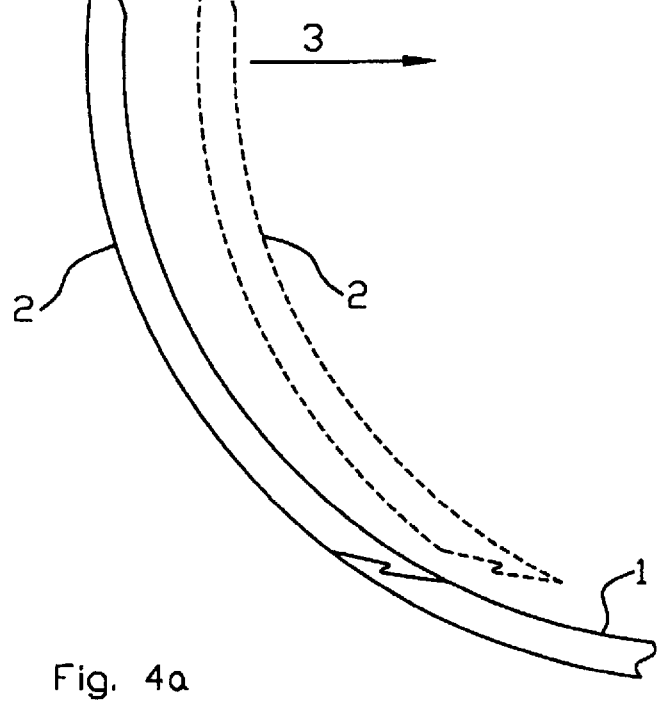
FIG. 4a is a cross sectional view of the door of FIG. 1, taken along the line 4—4 of FIG. 1.

FIG. 4a shows a vertical cross section through fuselage 1, showing the shape of door 2 and fuselage 1 at the top and bottom of the door, and showing the direction 3 of initial opening of the door 2. The direction 3 at the top and bottom 14 of the door opening is at an acute angle relative to a line perpendicular to the outer surface of door 2 at the door seat. Compare direction 3 to the direction of closing 4 on the circumferential portions of the door opening, as shown in FIG. 3a; direction 4 in FIG. 3a is perpendicular to the outer surface of door 2 at the door seat. Because of the curvature of fuselage 1 and the direction of opening, engaging faces 32, 39 (FIG. 4b) can be angled such that both pressure differential and sliding along the engaging faces 32, 39 due to hoop tension tend to force the door closed. As shown in FIG. 4B, face 32 is at an angle A, inclining away from the door opening and creating a hook-shaped member. The words "negative angle" are used to mean that the inclination from the root to the protruding corner of face 32 is away from the door opening. Since angle A is negative, there will be no force component due to hoop tension Th (indicated by numeral 9 in FIG. 4b) which tends to push door 2 closed. Such an angle A of the engaging faces 32, 39 assures that the door will overcome sliding friction and pull itself completely closed when a pressure differential begins even if door 2 is not initially completely seated. Faces 32, 39 frictionally engage and slide on one another during closing.

When the door 2 is closed on the ground (see FIG. 1), the door 2 is held in place by latches 12. These latches 12 are intended only to hold the door firmly closed when the aircraft is not flying and there is no differential pressure on the fuselage 1. The position of door 2 relative to the fuselage 1 is such that air flowing over the fuselage will produce a low pressure area over the door and pull the door tightly against the door jam even at takeoff altitude. When the aircraft climbs to above 7000 feet altitude where pressurization normally begins, pressure on the interior of the door 2 holds the door in place even more firmly.

Figure 5:
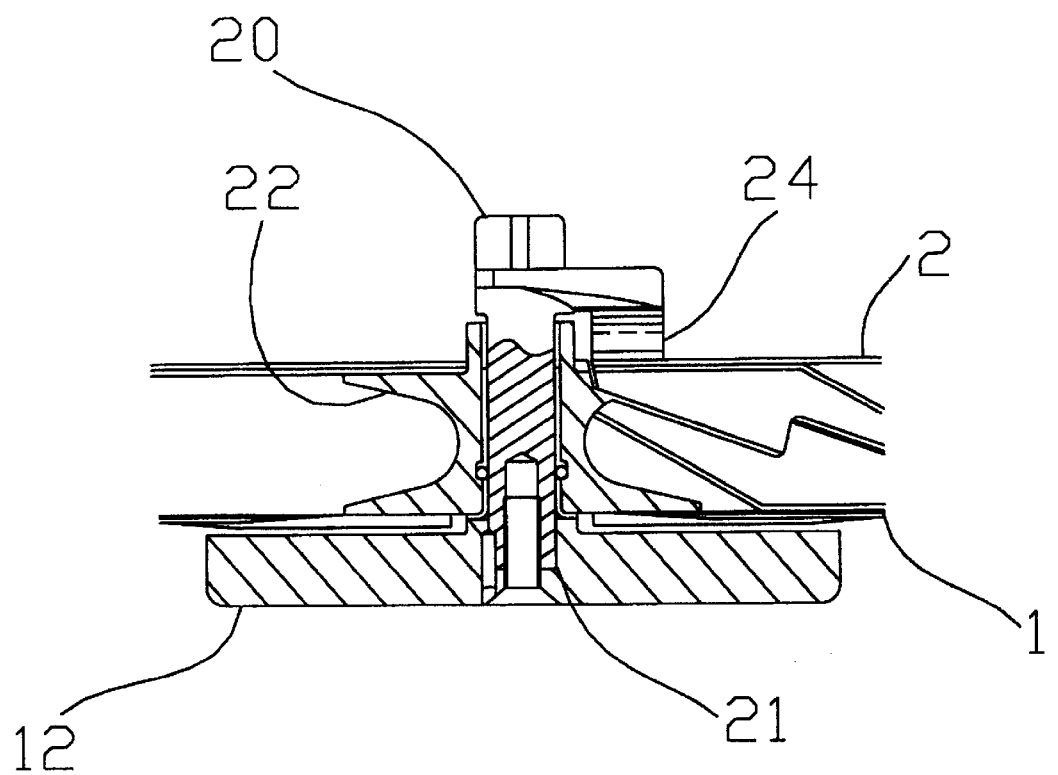
FIG. 5 shows a door latch mechanism for use with the door of FIG. 1.

FIG. 5 shows a section through the door latch mechanism. Interior handle 20 is attached to shaft 21 located within bushing 22, with both the shaft 21 and bushing 22 passing through the fuselage 1 from the interior to the exterior. The shaft 21 rotates within bushing 22. Exterior handle 12 is streamlined and is attached to the exterior end of shaft 21 such that when the door is latched closed, the long axis of exterior handle 23 is parallel to the airstream at cruise. Interior handle 20 has a cam 24 on the door side, which engages the surface of the door to latch the door.

The door assembly of the invention has many advantages over the prior art. The fuselage door provides a structural part of the fuselage that carries axial and hoop tension caused by cabin pressure instead of the axial and hoop tension being carried around the door in the door jamb structure. As a result, the door assembly can be lighter because there is no need to accommodate the stress concentration around the hole in the fuselage and there is no great bending moment in the door, requiring a substantial and heavy door structure.

An equally good embodiment of the invention could be carried out for an all-aluminum aircraft. The role of the fiberglass described above could be carried out with aluminum sheet, flush riveted or bonded in the seat area. The moldings could be modified to provide access for riveting. The foam areas in the fiberglass embodiment might become aluminum honeycomb or aluminum formers in the aluminum embodiment.

The invention is not limited to the preferred embodiment described above; on the contrary the invention extends to any variant that reproduces the above-described essential characteristics by equivalent means.

I claim:

1. A door assembly for a pressurized vessel, the pressurized vessel having a curved vessel wall with an outer surface and a door opening, the door assembly having a door for closing and sealing the door opening in the vessel wall, the door assembly comprising;

a door engaging seat facing inward on a perimeter portion of the door opening;

a vessel engaging seat facing outward on a perimeter portion of the door which mates with the door engaging seat, the vessel engaging seat abutting and being pressed against the door engaging seat by an outward directed force component resulting from internal pressure in the vessel;

the door engaging seat having a door engaging face which faces inward and away from the opening and is oriented at a selected acute angle relative to a line perpendicular to a portion of the outer surface of the vessel wall nearest the door engaging seat; and the vessel engaging seat having a vessel engaging face parallel to and mating with the door engaging face when the door is closed, wherein the internal pressure in the vessel creates tension which is transferred by the mating faces through the door.

2. The door assembly of claim 1 wherein the mating faces result in an inward directed force component on the door due to the tension, the inward directed force component being less than the outward directed force component on the door.

3. The door assembly of claim 1, wherein the vessel wall has an inner surface spaced inward from the outer surface and wherein the inward facing surface of the door engaging seat is beveled, providing the door opening at the outer surface of the wall with smaller dimensions than at the inner surface of the vessel wall.

4. The door assembly of claim 1, wherein:

the door engaging seat comprises two inclined portions which are located in separate planes and inclined relative to the outer surface of the vessel wall; and the door engaging face is a step located between and joining the inclined portions to each other.

5. The door assembly of claim 1, further comprising a seal located on one of the seats for sealing against the other of the seats.

6. A door assembly for a generally cylindrical pressurized vessel, the pressurized vessel having a curved vessel wall with an inner surface and an outer surface and a door opening, the door opening having two side edges which are transverse to the axis and curved along a circumferential portion of the vessel, the door assembly having a door for closing and sealing the door opening in the vessel wall, the door assembly comprising;

a door engaging seat extending around a perimeter of the door opening, the door engaging seat having an inward facing surface which is inclined relative to the inner and outer surfaces of the vessel wall;

a vessel engaging seat on a perimeter of the door, having an outward facing surface which mates with the inward facing surface of the door engaging seat to retain the door closed;

a door engaging face on the door engaging seat which faces generally away from the opening, the door engaging face being oriented at a selected acute angle relative to a line perpendicular to a portion of the outer surface of the vessel nearest the door engaging seat; and a vessel engaging face on the vessel engaging seat which is parallel to and engages the door engaging face when the door is closed, wherein internal pressure in the vessel creates tension which is transferred through the door by the mating faces.

7. The door assembly of claim 6, further comprising:

a latch for securing the door within the door opening.

8. The door assembly of claim 6 wherein the selection of the acute angle for the mating faces results in an inward directed force component on the door due to the tension, the inward directed force component being less than the outward directed force component on the door.

9. The door assembly of claim 6, wherein:

the inward facing surface of the door engaging seat comprises inner and outer inclined portions which are located in separate planes; and the door engaging face is a step located between and joining the inner and outer inclined portions.

10. The door assembly of claim 6, further comprising a seal located on one of the seats for sealing against the other of the seats.

11. The door assembly of claim 6, wherein the perimeter of the door opening has upper and lower edge portions which are generally straight and parallel with the axis of the vessel; and wherein the door engaging face at the upper and lower edge portions is generally hook-shaped.

12. A door assembly for a generally cylindrical pressurized aircraft fuselage, the fuselage having a curved wall with an inner and outer surface and a generally rectangular door opening, the door opening having a perimeter with top and bottom straight portions generally parallel with an axis of the vessel and two curved side portions extending circumferentially, the door assembly having a door for closing and sealing the door opening, the door assembly comprising;

a door engaging seat on the fuselage at the curved side portions, the door engaging seat having two inclined portions separated by a face which faces generally inward and away from the door opening, the inclined portions facing generally inward and toward the door opening;

a fuselage engaging seat on the door which has two inclined portions separated by a face for mating with the door engaging seat; and the face on the door engaging seat being oriented at a selected acute angle relative to a line perpendicular to the outer surface of the wall nearest the door engaging seat, the acute angle being selected such that an inward directed force component on the door transmitted through the mating faces due to tension from a pressure differential on the fuselage is less than the outward directed force component on the door due to the pressure differential on the fuselage.

13. The door assembly of claim 12, further comprising:

a straight door engaging seat at the straight portions of the door opening, the straight door engaging seat having a door engaging face oriented at a selected acute angle relative to a line perpendicular to the outer surface of the fuselage; and a straight fuselage engaging seat at mating straight portions of the perimeter of the door, having a fuselage engaging face parallel to and engaging the door engaging face when the door is in the closed position, the acute angle being selected such that an outward directed force component of hoop tension due to the acute angle and an outward directed force component of pressure differential on the door are greater than friction between door engaging faces, wherein the door closes itself under the influence of differential pressure.

14. The door assembly of claim 13, further comprising: a latch for securing the door within the door opening when the pressure differential is insufficient to hold the door in place.

* * * * *